UNITED STATES PATENT OFFICE.

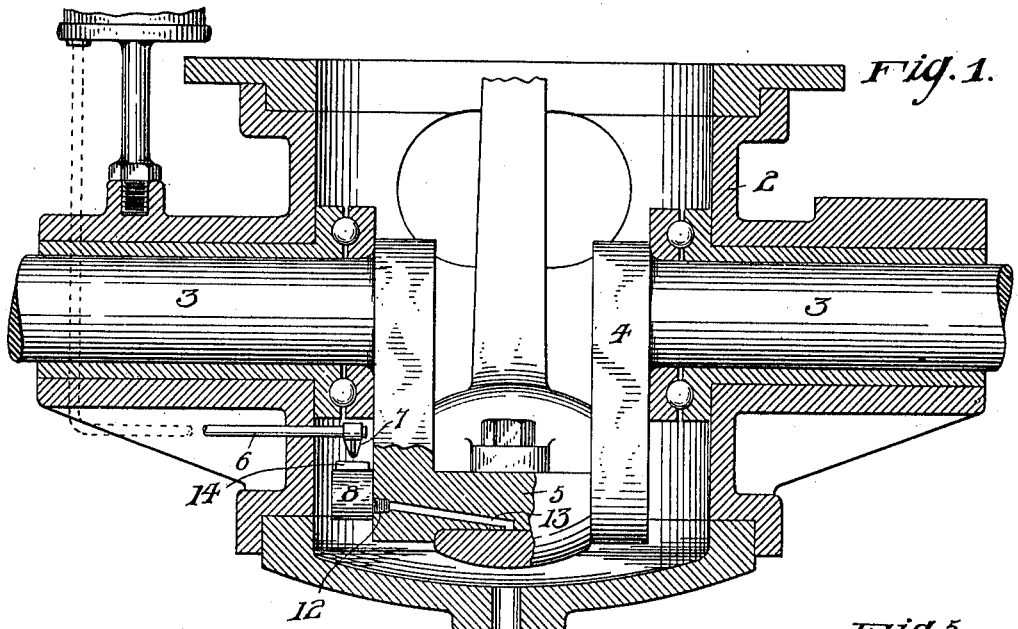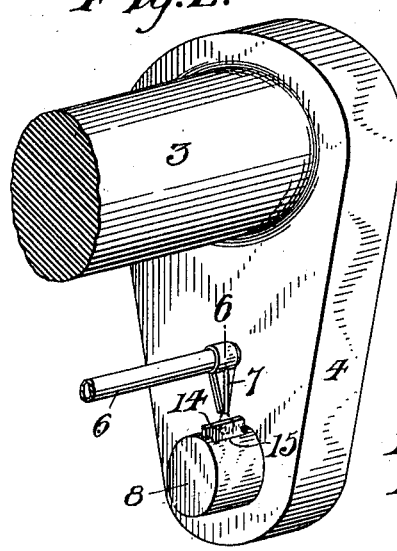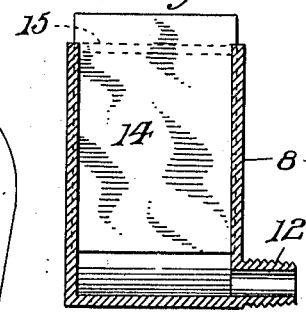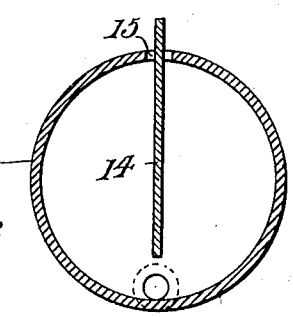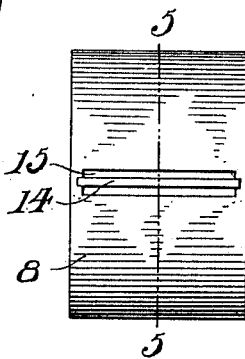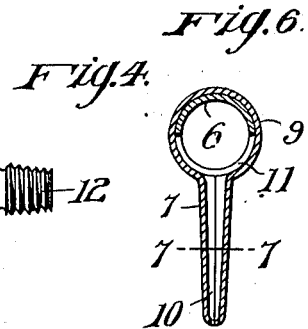

LEON ALLEMAN, OF ROCHESTER, PENNSYLVANIA.

LUBRICATING SYSTEM.

980,178. Specification of Letters Patent. Patented Jan. 3, 1911.

Application filed June 14, 1909. Serial No. 501,907.

*To all whom it may concern:*

Be it known that I, LEON ALLEMAN, of Rochester, in the county of Beaver, State of Pennsylvania, have invented a certain new and useful Improvement in Lubricating Systems, of which the following is a full, clear, and exact description.

The object of my invention is to provide a simple and inexpensive lubricating system for crank pins and the like; and it consists primarily in the utilization of centrifugal force in the conveying of the lubricant to the desired point of lubrication, as will be hereinafter more fully set forth.

I shall now describe my invention so that others skilled in the art to which it appertains may understand the same, referring to the accompanying drawing forming part of this specification and in which I have shown my invention as applied to the lubrication of the pin of a center crank of a vertical engine. I do not, however, desire to limit myself in this respect.

Figure 1 is a vertical sectional view through the crank casing of a vertical engine showing my invention applied to the lubricating of the crank pin of the center crank mounted therein, said crank and pin being shown partly in section; Fig. 2 is a perspective view of one side of the crank and showing, when the crank is in its lowered position, the relative position of the wiper cup carried by the crank and of the drip-nozzle adapted to feed lubricant to the said cup; Fig. 3 is a vertical sectional view of the wiper-cup; Fig. 4 is a plan view of the same; Fig. 5 is a sectional view taken on the line 5—5 of Fig. 4; Fig. 6 is a vertical sectional view of the lubricant drip-nozzle, being taken on the line 6—6 of Fig. 2; and Fig. 7 is a horizontal sectional view taken on the line 7—7 of Fig. 6.

In describing my invention, the reference numerals 2, 3, 4 and 5 represent the casing, crank shaft, crank and crank pin respectively of a vertical engine. Extending into the casing 2 beneath the shaft 3 is the oil pipe or conduit 6 which may be connected with any suitable source of supply and which is provided with the drip feeder nozzle 7 which overhangs the receiving cup 8 carried on the crank 4, when the said crank is in its lowered position as shown in Figs. 1 and 2.

Although any suitable drip-nozzle may be employed I prefer to use the nozzle shown in the drawings, consisting of the sheet metal clip 9 which embraces the end of the feeder pipe 6 and which is provided with the vertical duct 10 communicating with the slot 11 formed in the lower side of the pipe 6 (see Fig. 6). The cup 8 is secured to the crank 4 by means of the threaded stud 12 and communicates with the oil passage way 13 of the crank pin 5. A diametrical blade or wiper 14 extends from within the cup a short distance above the cup mouth 15.

With the lower sweep in the revolution of the crank 4 the wiper cup 8 passing beneath the drip-nozzle 7 gathers, by means of the wiper-plate 14, the drops of oil that are caused to be formed on the nozzle 7, as shown by the dotted lines in Fig. 2. The oil being fed at this point intermediate the cup 8 and the axis of rotation of the crank, it is caused to be conveyed within the cup 8 by centrifugal tendency, where it passes to the crank pin 5 through the duct 13. In utilizing the centrifugal force in this manner, the oil is placed under constant pressure, effecting a perfect distribution of the lubricant.

Although the means shown are, by reason of their simplicity and compactness, preferable, I do not desire to limit myself thereto.

The advantages of my invention will be found to reside in the fact that I am able to provide a pressure feed without employing complicated apparatus incident to the force feed type of lubricator.

Having thus described my invention, what I claim and desire to secure by Letters Patent is:—

1. A lubricating system, comprising in combination with a rotatory element, a cup carried thereby and provided with a blade extending diametrically therefrom toward the axis of rotation of the rotatory element, and a drop feeder connected to a lubricant supply and adapted to feed lubricant to the blade at a point intermediate the blade and the axis of rotation of the rotatory element.

2. A lubricating system, comprising in combination with a rotatory element, a cup carried thereby and provided with a blade extending diametrically therefrom toward the axis of rotation of the rotatory element, and a drop feeder connected to a lubricant supply and adapted to intermittently feed lubricant to the blade at a point intermediate the blade and the axis of rotation of the rotatory element.

In testimony whereof, I have hereunto set my hand.

LEON ALLEMAN.

Witnesses:
M. ARTHUR KELLER,
ANNA R. BEATTY.